Sept. 16, 1969   E. J. ZDANUK ETAL   3,467,517
TUNGSTEN POWDER BODIES IMPREGNATED WITH Zr AND Bi OR Sn.
Original Filed May 26, 1967

INVENTORS
RICHARD H. KROCK
EDWARD J. ZDANUK
BY Charles W. Hoffmann
ATTORNEY ns Patent Office
3,467,517
Patented Sept. 16, 1969

3,467,517
TUNGSTEN POWDER BODIES IMPREGNATED WITH Zr AND Bi OR Sn
Edward Joseph Zdanuk, Lexington, and Richard Howard Krock, Peabody, Mass., assignors to P. R. Mallory & Co. Inc., Indianapolis, Ind., a corporation of Delaware
Original application May 26, 1967, Ser. No. 641,698, now Patent No. 3,393,056, dated July 16, 1968. Divided and this application Feb. 6, 1968, Ser. No. 726,622
Int. Cl. B22f 7/06
U.S. Cl. 75—208      10 Claims

ABSTRACT OF THE DISCLOSURE

Low gas content composites of tungsten-copper-zirconium-bismuth or tungsten-copper-zirconium-tin for use as vacuum switch contact materials.

---

Figure 1:
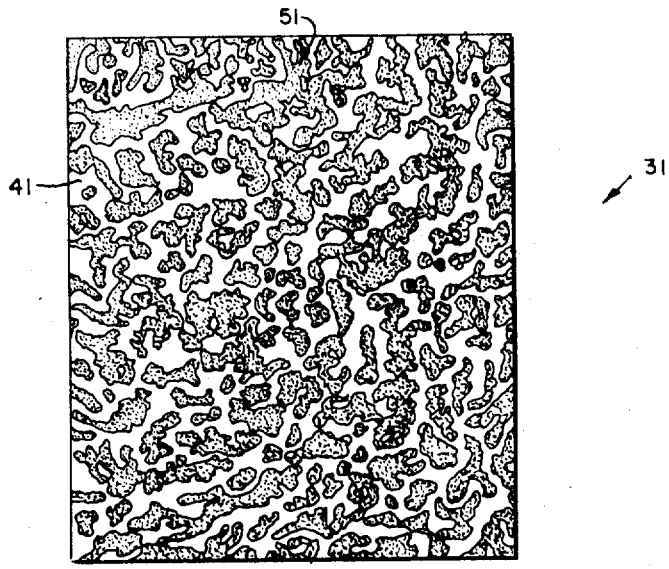

This is a division of application Ser. No. 641,698, filed May 26, 1967, now Patent No. 3,393,056.

The present invention relates to improved means and methods of providing composite materials for use as an electrical contact material in high temperature vacuum environments.

It was found that by using vacuum infiltration techniques, copper-zirconium-bismuth and copper-zirconium-tin alloys, zirconium sandwiched between copper-bismuth or copper-tin alloys and a tungsten powder body and subsequently heated to form copper-zirconium-bismuth or copper-zirconium-tin alloy, a tungsten powder body whose tungsten particles were coated with zirconium by electroplating or vapor phase plating placed in contact with copper-bismuth or copper-tin alloys, and the like, wet the individual particles composing the tungsten powder body so as to allow infiltration of the powder body by the copper-zirconium-bismuth or copper-zirconium-tin alloys. The resultant composite bodies have a high concentration of zirconium in the interface region between the tungsten particles and the copper-zirconium-bismuth or the copper-zirconium-tin alloy thereby increasing the overall electrical conductivity of the copper alloy matrix. The use of vacuum infiltration techniques also decreases the amount of gaseous components present in the resultant tungsten-zirconium-copper-bismuth and the tungsten-copper-zirconium-tin composites to less than 10 parts per million.

It is known that complete and substantially instantaneous infiltration of copper into sintered tungsten bodies can be accomplished in an atmosphere of hydrogen. However, copper or copper alloy melts show substantially no penetration into compacted tungsten powder bodies, whether sintered or unsintered, in a vacuum atmosphere using comparable time-temperature treatments and using standard metallurgical procedures. In carrying out the present invention, it was found that subjecting a compacted tungsten powder body and a contacting copper-zirconium-bismuth alloy or a copper-zirconium-tin alloy in a vacuum infiltration process, the copper-zirconium-bismuth alloy and the copper-zirconium-tin alloy were absorbed into the tungsten body by capillary attraction. It is thought that in each instance the zirconium constituent of the alloy promoted wetting of the tungsten particles by the copper-zirconium-bismuth alloy and the copper-zirconium-tin alloy.

The bismuth and the tin constituents of the resultant composite contact materials are necessary additions for sustaining an electrical arc at low values of current and voltages during the operation of the composite contact material in vacuum environments. This is achieved since the bismuth and the tin constituents of the respective alloys have high vapor pressure characteristics.

In several of the prior art contact materials, tungsten is used in electrical contact material, due to its inherent characteristics of hardness and of resistance to arc erosion and welding. However, it is known that contact material fabricated from substantially pure tungsten possesses high electrical resistance which lowers the efficiency and reliability of the resultant contact material.

Several of the prior art contact materials make advantageous use of the several outstanding characteristics of tungsten and of copper by fabricating an integral tungsten-copper composite contact material. In the composite, the copper constituent contributes several necessary properties such as current carrying capability and thermal conductivity while the tungsten constituent provides several desired properties such as hardness, resistance to arc erosion, and superior anti-weld properties. As recognized in several of the prior art switching composites, utilization of the aforementioned characteristics of copper and of tungsten is achieved by fabricating the metals as a tungsten-copper composite.

It is known that copper and tungsten are mutually insoluble and form no alloys in the metallurgical sense. However, in the prior art mixtures of the two metals are generally referred to as alloys although the more correct term is "composite." Tungsten-copper composites may be prepared by using one of several methods. For example, composites of tungsten-copper may be prepared by pressing blended tungsten and copper powders to the required shape in dies forming a green compact, and subsequently sintering the green compact in a hydrogen atmosphere above the melting point temperature of the copper, preferably between 1250° and 1350° C. The hydrogen acts as a flux agent and the molten copper wets the tungsten particles and cements them together thereby providing a body of sintered tungsten particles in a copper matrix. Another method which provides a harder resultant body consists of first pressing and sintering the tungsten powder so as to form a coherent but porous body, which is then heated at a temperature of about 1200° C. to 1300° C. in a hydrogen atmosphere and in contact with molten copper. The melt of copper is absorbed into the pores of the tungsten powder body by capillary attraction. The copper infiltrant imparts strength and ductility to the tungsten powder body and also provides the resultant body with higher electrical conductivity and thermal conductivity. However, it was found that a copper melt shows no penetration into the sintered tungsten powder body in a vacuum using standard metallurgical procedures. It is thought that the lack of penetration of the copper into the tungsten powder body is due to the unfavorable surface energies between the interface of the tungsten particles and the molten copper that are present in the vacuum.

If there is no solubility between the metals, as is the situation between tungsten and copper, and if the wetting is poor, an auxiliary agent for influencing the surface energies in the desired direction is required.

It was found that zirconium behaves as such an agent. Vacuum infiltration with melts of copper-zirconium-bismuth and copper-zirconium-tin result in complete infiltration of both sintered and unsintered tungsten powder bodies. It is thought the zirconium either raises the surface energies of the melt or of the solid, or lowers the surface energy of the interface between the melt and the solid. It is thought the vacuum serves the dual purpose of promoting the penetration of the melt into the tungsten powder body and of significantly decreasing the content to less than 10 parts per million in the composite. The resultant tungsten-copper-zirconium-bismuth and tungsten-copper-zirconium-tin must contain a low content of gaseous components and have some relatively high vapor pressure characteristics before the material is acceptable for application in vacuum environments.

The additions of bismuth and tin to the composites provides a resultant composite contact material that sustains an arc at low magnitudes of current and voltages during the operation of the contact materials in a vacuum. It is thought that the foregoing occurrence is due to the relatively high vapor pressure characteristics of bismuth and of tin.

Therefore it is an object of the present invention to provide coomposite materials having a low content of gaseous components and having some relatively high vapor pressure potential for use as a contact material in vacuum electrical switching devices.

A further object of the present invention is to provide composite materials consisting of about 60 to 95 percent, by weight, tungsten, the remainder an alloy of copper.

Still another object of the present invention is to provide a tungsten composite material for use in a vacuum environment which sustains an electrical arc at low current and voltage values during operation of the contact material.

Yet another object of the present invention is to provide a means and method of infiltrating a refractory body with an electrically conducting material thereby providing a contact material which is low in gas content and low in materials that may be converted to gaseous materials during operation of the contact material.

Another object of the present invention is to provide composite materials of sintered tungsten particles in matrices of copper-zirconium-bismuth and of copper-zirconium-tin for use as electrical contact materials wherein a higher concentration of zirconium appears in the interface region of the tungsten particles than between the tungsten particles thereby raising the over-all electrical conductivity of the alloy matrices.

A further object of the present invention is to provide means and methods of fabricating composite contact materials using vacuum infiltration techniques, the composite contact materials having high electrical and thermal conductivity, combined with low erosion during subjection to arcing and low deformation during the application of pressure.

Another object of the present invention is to provide alloys which include an agent that wets tungsten particles, that is ductile, that has high electrical and thermal conductivity, and that has a melting point that is less than the melting point temperature of tungsten.

Yet still another object of the present invention is to provide means and methods of using copper-zirconium-bismuth alloys and copper-zirconium-tin alloys as infiltration stock for tungsten powder bodies so as to allow complete vacuum infiltration of the tungsten powder body thereby providing a composite contact material having integrally joined constituents of tungsten-copper-zirconium-bismuth and tungsten-copper-zirconium-tin.

The present invention, in another of its aspects relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and in the appended claims.

In the drawings:

FIGURE 1 is a photomicrograph of about 500 magnifications of a tungsten-copper-zirconium-bismuth composite contact material showing a sintered tungsten specimen completely vacuum infiltered with a copper-zirconium-bismuth alloy containing about 0.25 percent, by weight, zirconium, 5 percent, by weight, bismuth, the remainder copper. The infiltration was carried out at about 1250° C. for about 1 hour at a pressure of less than $10^{-5}$ torr.

Figure 2:
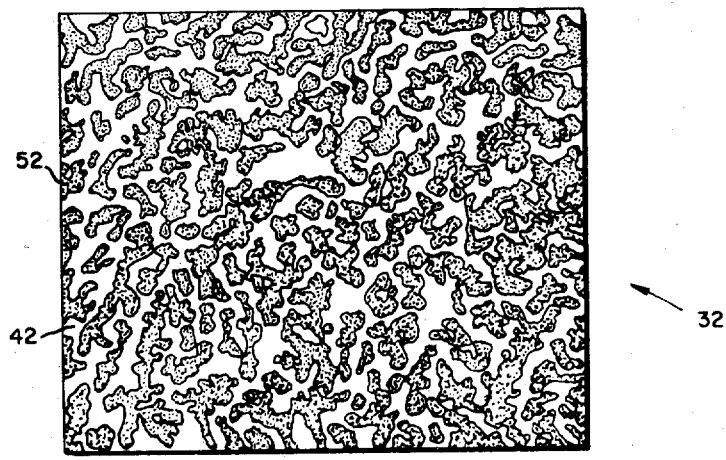

FIGURE 2 is a photomicrograph of about 500 magnifications of tungsten-copper-zirconium-tin composite contact material showing a sintered tungsten specimen completely vacuum infiltrated with a copper-zirconium-tin alloy containing about 0.25 percent, by weight, zirconium, 5 percent, by weight, tin, and the remainder copper. The infiltration was carried out at about 1250° C. for about 1 hour at a pressure of less than $10^{-5}$ torr.

Generally speaking, the means and methods of the present invention relate to electrical contact materials for use in switching devices such as, for example, in a vacuum electrical power switching means. The contact materials consist of sintered tungsten bodies completely vacuum infiltrated with a copper-zirconium-bismuth alloy or with a copper-zirconium-tin alloy. The tungsten constituent of the alloy is about 60 to 95 percent by weight. The copper alloy constituent is the remainder of the composite. The copper-zirconium-bismuth alloy consists of about 0.1 to 0.25 percent, by weight, zirconium, about 0.5 to 12.5 percent, by weight, tin, and the remainder copper. The copper-zirconium-tin alloy consists of about 0.1 to 0.25 percent, by weight, zirconium, about 0.5 to 12.5 percent, by weight, tin, and the remainder copper.

The method of making a tungsten body infiltrated with alloys of copper comprises the steps of compacting powdered tungsten particles into desired body shape. The tungsten body is contacted with a copper-zirconium-bismuth alloy or a copper-zirconium-tin alloy which when heated above their respective melting points utilizes the zirconium component for wetting the tungsten particles. The tungsten body and the contacting copper alloy are placed in a vacuum atmosphere and heated to completely infiltrate the tungsten body with the copper alloy thereby providing a composite contact material for use in vacuum environments.

More particularly, the means and methods of the present invention relate to fabrication of tungsten bodies infiltered with an alloy of copper-zirconium-bismuth or copper-zirconium-tin for use as an electrical contact in vacuum environments. The tungsten powder has an average particle size of about 1 to 10 microns and has a gas content of less than 50 parts per million. The tungsten particles are compacted under pressure ranging from 20 to 35 tons per square inch into a desired body shape. The green tungsten compact has a density of between 50 and 60 percent of theoretical density. The tungsten body may be presintered in a hydrogen atmosphere at about 1250° C. from between ½ hour to 3 hours. A sintered tungsten body has a density of about 60 to 90 percent of theoretical density. The exposed surfaces of the sintered tungsten body were contacted with an alloy of copper-zirconium-bismuth or of copper-titanium-tin. The copper-zirconium-bismuth alloy consisted of about 0.1 to 0.25 percent, by weight, zirconium, about 0.5 to 12.5 percent, by weight, bismuth, the remainder copper. The copper-zirconium-tin alloy consisted of about 0.1 to 0.25 percent, by weight, zirconium, about 0.5 to 12.5 percent, by weight, tin, the remainder copper. In all instances, the zirconium was used to promote the wetting of the tungsten particles by the copper-zirconium-bismuth and the copper-zirconium-tin alloys. The tungsten body and the contacting copper alloy were placed in a vacuum atmosphere having a pressure of less than $10^{-5}$ torr and heated to a temperature of between 1250° and 1450° C. for a time duration of between 20 minutes and 60 minutes. The tungsten body was completely vacuum infiltrated with the copper alloy thereby forming a tungsten-copper-zirconium-bismuth or a tungsten-copper-zirconium-tin composite for use as a contact material in vacuum environments.

The tungsten content of the resultant composite contact material is about 60 to about 95 percent, by weight, tungsten. The tungsten content of the composite may be regulated by varying several parameters of the fabricating sequence such as using unsintered or sintered bodies or by varying the particle size of the tungsten powder, the compacting pressures and the time-temperature of the sintering. These factors will be discussed hereinafter.

Exceeding 12.5 percent, by weight, of either bismuth or tin in the alloy matrix adversely affects the infiltration process and exceeding 0.25 percent, by weight, of zirconium in the alloy matrix detrimentally affects the electrical conductivity of the resultant composite. To achieve a composite with a tungsten content of greater than 95 percent, by weight, is very difficult and would preclude any substantial increase in electrical conductivity or in vapor pressure potential of the composite. If the resultant composite contains less than 60 percent, by weight, tungsten, the hardness and erosion characteristics of the composite material suffer. It should be noted that if other property or properties of the composite is or are desired to be optimized, the percentage, by weight, of bismuth or tin may exceed the range specified herein. However, it was found that less than 0.1 percent, by weight, zirconium, seriously reduces the rate of infiltration of the compact by the copper alloy. However, complete infiltration of the compact by copper may be achieved by a more extensive time-temperature cycle.

In carrying out the present invention, it was found for a tungsten-copper system, alloys of copper-zirconium-bismuth or of copper-zirconium-tin having small amounts of zirconium when brought into contact with the tungsten powder body in a heated vacuum environment resulted in the contacting copper alloy completely infiltrating the tungsten powder body thereby providing a dense composite material having a density of about between 90 and 99 percent of theoretical density. It is thought that the small amounts of zirconium is sufficient to either raise the surface energies of the melt of the copper alloy or of the tungsten particles or lower the surface energy of the interface between the melt and the solid.

The resultant composites were dense and have high electrical and thermal conductivity combined with high resistance to arc erosion and a deformation under pressure.

In forming the tungsten powder body, a suitable mold was utilized to form the tungsten powder into the desired shape. The size of the particles of tungsten may vary in accordance with the desired density of the composite contact material and with the desired pore size distribution of the composite contact material. Tungsten powder having a particle size of about 1 micron to 10 microns and having a gas content of 50 parts per million or less is utilized. Tungsten powder having a larger particle size may be used, however, the green compact required the incorporation therein of ancillary means such as binders and the like to facilitate handling and the like of the compact. Necessarily, problems are created with attempting to remove the binder and the like prior to infiltration. However, it should be understood that tungsten powder having a larger or smaller particle size may be used.

The tungsten particles are compacted within the confines of a suitable mold by a compacting pressure ranging between 20 and 35 tons per square inch thereby forming a porous tungsten body having a density of about 55 percent of theoretical density. It is desired to further strengthen the tungsten body prior to infiltration and/or provide a composite having a higher tungsten content, the tungsten body may be sintered in an atmosphere of hydrogen at a temperature of between 1400° C. and 2200° C. for a time duration of about ½ hour to 50 hours to thereby provide a composite having a density of about 60 to 95 percent of theoretical density. FIGURES 1 and 2 show a composite structure wherein the tungsten compacts were sintered prior to infiltration. After the preparatory treatment was completed, the strength of the tungsten compact was materially increased, and the compacts can be handled readily. Very little grain growth takes place during the presinter treatment, and the increase in strength of the compact may be due to the reduction of the surface film of oxide on the individual tungsten particles, the reduced metal acting as a cement which binds the tungsten particles together. It is thought that diffusion between adjacent tungsten particles contributes to the sintering of the compact.

It should be pointed out that the presinter treatment of the tungsten compact in the hydrogen atmosphere is not a necessary prerequisite to the successful infiltration of the tungsten powder body with the copper alloys described hereinbefore.

The tungsten specimen, sintered or not, is placed in a vacuum having a pressure of less than $10^{-5}$ torr and contacted with a copper alloy containing about 0.25 percent, by weight, or less of zirconium and 12.5 percent, by weight, or less bismuth, or of tin. The tungsten specimen and the contacting copper alloy were heated to a temperature of between about 1200° C. to 1450° C. The range of temperatures exceeds the melting point temperature of the aforementioned copper alloys which is about 1080° C. but is below the 3410° C. melting point temperature of tungsten.

A chemical analysis of the resultant composite body showed that vacuum processing decreases the volume of hydrogen by more than an order and decreases the volume of other gaseous components by several orders. The total gaseous content of the composite was found to be less than 10 parts per million of the sum total of the metallic constituents.

An electron probe analysis of the region between tungsten particles composed of the copper-zirconium-bismuth alloy or of the copper-zirconium-tin alloy showed a segregation or a high concentration of zirconium in the interface region between the tungsten particles and copper-zirconium-bismuth alloy and between the tungsten particles and the copper-zirconium-tin alloy. The high concentration of zirconium in the interface region explains how relatively small additions of zirconium remain highly active during the extensive penetration of the tungsten body by infiltrant.

The bulk of the region between the tungsten particles contains a much lower concentration of zirconium than the nominal concentration in the infiltration stock. Since zirconium in solid solution lowers the conductivity of copper, the zirconium segregation has a dual advantage, that is, in addition to efficiently promoting the wetting and the infiltration in a vacuum environment, the segregation also increases the overall electrical conductivity of the infiltration alloy above that which would have been expected from the nominal concentration of zirconium in the infiltration stock.

Referring to the drawings, FIGURE 1 illustrates a tungsten-copper-zirconium-bismuth composite 31 consisting of a sintered porous compact of continuous tungsten particles 41 which has been completely infiltrated by a coherent network of copper-zirconium-bismuth 51. The metal surfaces of the copper-zirconium-bismuth mixture are integrally bonded by surface diffusion to the tungsten particles. The copper-zirconium allow used to contact the tungsten powder body prior to vacuum infiltration contained about 0.1 percent, by weight, zirconium, 5 percent, by weight, bismuth, and the remainder copper. During vacuum infiltration, the porous tungsten body and the contacting alloy were subjected to a temperature of about 1250° C. for about 60 minutes at a pressure of less than $10^{-5}$ torr.

FIGURE 2 shows a tungsten-copper-zirconium-tin composite 32 consisting of a porous compact of tungsten particles 42 has been completely infiltrated by a coherent network of copper-zirconium-tin 52. The metal surfaces of the copper-zirconium-tin alloy are integrally bonded by surface diffusion to the tungsten particles. The copper-zirconium-tin alloy used to contact the tungsten powder body prior to vacuum infiltration contains about 0.1 percent, by weight, zirconium, 5 percent, by weight, tin and the remainder copper. During vacuum infiltration, the porous tungsten body and the contacting alloy were subjected to a temperature of about 1250° C. for about 60 minutes at a pressure of less than 10⁻⁵ torr.

The following Examples 1 to 5 are illustrative of the preparation of tungsten-copper-zirconium-bismuth contact materials by vacuum infiltration of a tungsten powder body with copper-zirconium-bismuth alloys. Examples 6 to 10 are illustrative of the preparation of the tungsten-copper-zirconium-tin contact materials by vacuum infiltration of a tungsten powder body with copper-zirconium-tin alloys.

EXAMPLE 1

A sintered tungsten body completely vacuum infiltrated by an alloy of copper-zirconium-bismuth the alloy containing about 0.1 percent, by weight, zirconium, 5 percent, by weight, bismuth, the remainder copper.

Powdered tungsten having a particle size of about 1 to 10 microns and a gas content of 50 parts per million or less was pressed by an automatic press at about 20 tons per square inch to provide a green compact having a density of about 55 percent of theoretical density. The green compact was given a presintering treatment at about 1250° C. for about 10 minutes in an atmosphere of hydrogen. After sintering in a vacuum at 1700° C. the tungsten skeleton had a density of about 70 percent of theoretical density. The presintering of the compact served to increase the strength of the compact by diffusion of the adjacent tungsten particles thereby bonding abutting particles. The sintered porous compact was contacted with an alloy of copper-zirconium-bismuth having a zirconium content of about 0.1 percent, by weight, 5 percent, by weight, bismuth, the remainder copper. The sintered tungsten compact and the contacting copper alloy were placed in a vacuum atmosphere having a pressure of less than 10⁻⁵ torr and were heated at a temperature of about 1250° C. for a time duration of about 1 hour thereby completely infiltrating the sintered tungsten body. The tungsten structure consisted essentially of about 85 percent, by weight, tungsten, the remainder the copper alloy. The tungsten structure may consist of up to 95 percent, by weight, tungsten, by increasing the compacting pressure, the presintered time or both. Also, an individual tungsten-copper-zirconium-bismuth composite was prepared using an infiltration time-temperature cycle of about 1450° C. for about 30 minutes using the abovementioned procedure. The porous tungsten body was found to be completely vacuum infiltrated by the copper-zirconium-bismuth alloy. The resultant tungsten-copper-zirconium-bismuth composite is illustrated in FIGURE 1 of the drawing.

EXAMPLE 2

A green compact powder body completely vacuum infiltrated by an alloy copper-zirconium-bismuth, the alloy of copper-zirconium-bismuth containing about 0.1 percent, by weight, zirconium, 5 percent, by weight, bismuth, the remainder copper.

Powdered tungsten having a particle size of about 1 micron to about 10 microns and a gas content of 50 parts per million or less was compacted with a manually operated press at about 20 tons per square inch to provide a green compact having a density of about 50 percent of theoretical density. The porous green compact was contacted with an alloy of copper-zirconium-bismuth having a zirconium content of about 0.1 percent, by weight, zirconium, 5 percent, by weight, bismuth, the remainder copper. The green tungsten compact and the contacting alloy of copper-zirconium-bismuth were placed in a vacuum atmosphere having a pressure of less than 10⁻⁵ torr and were heated at about 1250° C. for about 1 hour. The copper alloy completely infiltrated the porous tungsten body thereby providing a tungsten structure consisting essentially of about 60 percent, by weight, tungsten, the remainder the copper alloy. In addition, an individual tungsten-copper-zirconium-bismuth composite was prepared using a time-temperature treatment of about 1450° C. for about 20 minutes using the abovementioned procedure. In each instance, the porous tungsten body was found to be completely infiltrated by the copper-zirconium-bismuth alloy.

EXAMPLE 3

A green tungsten powder body completely vacuum infiltrated by an alloy of copper-zirconium-bismuth.

The procedure of Example 2 was followed using an alloy of copper containing about 0.25 percent, by weight, zirconium, 12.5 percent, by weight, bismuth and the remainder copper. The composite was formed by heating to about 1450° C. for about 20 minutes and another composite was formed by heating to about 1250° C. for about 1 hour using the aforementioned procedure. The resultant composites consisted essentially of about 60 percent, by weight, tungsten, the remainder the copper alloy.

EXAMPLE 4

A green tungsten powder body completely vacuum infiltrated by an alloy of copper-zirconium-bismuth.

The procedure of Example 2 was followed using an alloy of copper containing about 0.1 percent, by weight, zirconium, 0.5 percent, by weight, bismuth and the remainder copper. The composite was formed by heating to about 1450° C. for about 20 minutes and another composite was formed by heating to about 1250° C. for about 1 hour using the aforementioned procedure. The resultant composite consisted essentially of about 60 percent, by weight, tungsten, the remainder the copper alloy.

EXAMPLE 5

A sintered tungsten powder body completely vacuum infiltrated by an alloy of copper-zirconium-bismuth.

The procedure of Example 1 was followed using an alloy of copper containing about 0.25 percent, by weight, zirconium, 12.5 percent, by weight, bismuth, and the remainder copper. The composite was formed by compacting at about 35 tons per square inch and a presintering treatment in hydrogen at 1250° C. for about 10 minutes. After sintering the tungsten body was contacted with the copper alloy and heated to about 1450° C. for about 20 minutes. Another composite was formed by heating to about 1250° C. for about 1 hour using the aforementioned procedure. The resultant composites consisted essentially of about 90 percent, by weight, tungsten, the remainder the copper alloy.

EXAMPLE 6

A sintered tungsten body completely vacuum infiltrated by an alloy of copper-zirconium-tin, the alloy of copper-zirconium-tin containing about 0.1 percent, by weight, zirconium, 5 percent, by weight, tin, the remainder copper.

Powdered tungsten having a particle size of about 1 micron to about 10 microns and a gas content of less than 50 parts per million was pressed by an automatic press at about 20 tons per square inch to provide a green compact having a density of about 55 percent of theoretical density. The green compact was given a presintering treatment at a temperature of about 1250° C. for about 10 minutes in a hydrogen atmosphere. After sintering in vacuum the compact had a density of about 70 percent of theoretical density. The sintered porous tungsten compact is contacted with an alloy of about 0.1 percent, by weight, zirconium, 5 percent, by weight, tin, the remainder copper. The sintered tungsten compact and the contacting copper alloy were placed in a vacuum atmosphere having a pressure of 10⁻⁵ torr or less and heated at about 1250° C. for about 1 hour thereby completely infiltrating the tungsten composite with the copper alloy. The composite consisted essentially of about 85 percent, by weight, tungsten, the remainder the copper alloy. Also, an individual tungsten-copper-zirconium-tin composite was prepared using a time-temperature treatment of about 1450° C. for about 20 minutes using the above procedure. The porous tungsten body was found to be completely infiltrated by the copper-zirconium-tin alloy.

EXAMPLE 7

A green tungsten powder body completely vacuum infiltrated by an alloy of copper-zirconium-tin.

Powdered tungsten having a particle size of about 1 micron to about 10 microns and a gas content of less than 50 parts per million was pressed by any suitable means such as by an automatic press at about 20 tons per square inch to provide a green compact having a density of about 50 percent of theoretical density. The green porous tungsten compact was contacted with a copper alloy containing about 0.1 percent, by weight, zirconium, 5 percent, by weight, tin, the remainder copper. The green tungsten compact and the contacting alloy of copper-zirconium were placed in a vacuum atmosphere having a pressure of $10^{-5}$ torr or less and were heated at about 1250° C. for about 1 hour providing a tungsten composite consisting essentially of about 60 percent, by weight, tungsten, the remainder the copper alloy. Also, an individual tungsten-copper-zirconium-tin composite was prepared using a time-temperature treatment of about 1450° C. for about 20 minutes using the above procedure. The porous tungsten body was found to be completely infiltrated by the copper-zirconium-tin alloy.

EXAMPLE 8

A green tungsten powder body completely vacuum infiltrated by an alloy of copper-zirconium-tin.

The procedure of Example 7 was followed using an alloy of copper containing about 0.25 percent, by weight, zirconium, about 12.5 percent, by weight, tin and the remainder copper. The composite was heated to about 1450° C. for about 20 minutes and another composite was heated to about 1250° C. for about 1 hour using the aforementioned procedure. The resultant composites contained about 60 percent, by weight, tungsten, the remainder the copper alloy.

EXAMPLE 9

A green tungsten powder body completely vacuum infiltrated by an alloy of copper-zirconium-tin.

The procedure of Example 7 was followed using an alloy of copper containing about 0.1 percent, by weight, zirconium, about 0.5 percent, by weight, tin and the remainder copper. The composite was heated to about 1450° C. for about 20 minutes and another composite was heated to about 1250° C. for about 1 hour using the aforementioned procedure. The resultant composites contained about 60 percent, by weight, tungsten the remainder the copper alloy.

EXAMPLE 10

A sintered tungsten powder body completely vacuum infiltrated by an alloy of copper-zirconium-tin.

The procedure of Example 6 was followed using an alloy of copper containing about 0.25 percent, by weight, zirconium, 12.5 percent, by weight, tin and the remainder copper. The tungsten compact was formed by compacting at about 35 tons per square inch and a presintering heating at about 1250° C. for about 10 minutes. After vacuum sintering the tungsten body was contacted with the copper alloy and heated to about 1450° C. for about 20 minutes and another composite was heated to about 1250° C. for about 1 hour using the aforementioned procedure. The resultant composites consisted essentially of about 90 percent, by weight tungsten, the remainder the copper alloy.

It should be noted that an increase in the temperature treatment results in a decrease in the time treatment required to completely vacuum infiltrate the tungsten body with the ternary alloy of copper. An incerase in the bismuth or the tin content in the copper alloy requires an increase in amount of zirconium contained in the alloy in order to successfully vacuum infiltrate in the time-temperature treatments specified.

It is thought that the tungsten powder body or the presintered tungsten body may be coated with zirconium by electroplating or vapor phase plating, impregnation of the coated body could be carried out successfully with binary alloys of copper-bismuth and copper-tin. Vacuum impregnation will occur as long as zirconium is at the interface of the tungsten particle. The amount of plated zirconium would be such that its composition would amount to 0.1 to 0.25 percent by weight of that of the amount of the binary copper alloy required to fill the voids.

The present invention is not intended to be limited to the disclosure herein, and changes and modifications may be made by those skilled in the art without departing from the spirit and the scope of the present invention. Such modifications and variations are considered to be within the purview and the scope of the present invention and the appended claims.

Having thus described our invention, we claim:

1. A method of making an infiltrated tungsten powder body for use as an electrical contact material comprising: contacting at least one surface of a compacted tungsten body with an alloy of copper, said alloy consisting essentially of a trace to 0.25 weight percent zirconium and a high vapor pressure substance selected from the group consisting of 0.5 to 12.5% by weight bismuth, 0.5 to 12.5% by weight tin, and mixtures thereof, the balance essentially copper, in a vacuum atmosphere; and heating said tungsten body and said alloy so as to completely vacuum infiltrate said tungsten body with said alloy of copper thereby forming a composite material consisting essentially of tungsten-copper-zirconium and said high vapor pressure substance for use as a contact material.

2. The method according to claim 1, wherein said copper alloy consists essentially of about 0.1 to 0.25 percent, by weight, zirconium, 0.5 to 12.5 percent, by weight bismuth, the remainder essentially copper.

3. The method according to claim 1, wherein said ternary copper alloy consists essentially of about 0.1 to 0.25 percent, by weight, zirconium, 0.5 to 12.5 percent, by weight, tin, the remainder essentially copper.

4. The method according to claim 1, wherein said vacuum atmosphere has a pressure less than $10^{-5}$ torr.

5. The method according to claim 1, wherein said heating is to a temperature of between about 1250° C. and 1450° C. for a time duration of between about 20 minutes and 60 minutes.

6. The method according to claim 1, including the step of compacting said tungsten body prior to contacting it with said alloy.

7. A method according to claim 6 in which a pressure of about 20–35 tons per square inch is used in the compacting step.

8. The method according to claim 7, wherein the particle size of the tungsten to be compacted is between about 1 to 10 microns.

9. The method according to claim 6 including the additional step of a presintering heating of said compacted tungsten body in a hydrogen atmosphere prior to contacting the tungsten body with said alloy.

10. A method according to claim 9 in which the preheating is done at a temperature of about 1250° C. for a time duration of about 10 minutes.

References Cited

UNITED STATES PATENTS

| | | | |
|---|---|---|---|
| 3,303,026 | 2/1967 | Zdanuk | 75—208 |
| 3,303,559 | 2/1967 | Holtzclaw | 29—420.5 |
| 3,337,338 | 8/1967 | Krock | 75—208 |

BENJAMIN R. PADGETT, Primary Examiner

ARTHUR J. STEINER, Assistant Examiner

U.S. Cl. X.R.

29—182.1; 75—214